United States Patent
Zuckerman et al.

(10) Patent No.: US 10,255,206 B2
(45) Date of Patent: Apr. 9, 2019

(54) STORAGE MEMORY DIRECT ACCESS (71) Applicant: HEWLETT PACKARD ENTERPRISE DEVELOPMENT LP, Houston, TX (US)

(72) Inventors: Boris Zuckerman, Andover, MA (US); Douglas L. Voigt, Boise, ID (US); Suparna Bhattacharya, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 15/543,170

(22) PCT Filed: Sep. 23, 2015

(86) PCT No.: PCT/US2015/051688
§ 371 (c)(1),
(2) Date: Jul. 12, 2017

(87) PCT Pub. No.: WO2016/178706
PCT Pub. Date: Nov. 10, 2016

(65) Prior Publication Data
US 2018/0018290 A1 Jan. 18, 2018

(30) Foreign Application Priority Data
May 2, 2015 (IN) .......................... 2256/CHE/2015

(51) Int. Cl.
*G06F 13/16* (2006.01)
*G06F 3/06* (2006.01)
*G06F 12/0804* (2016.01)
*G06F 9/46* (2006.01)
*G06F 12/126* (2016.01)

(52) U.S. Cl.
CPC ............. *G06F 13/16* (2013.01); *G06F 3/061* (2013.01); *G06F 3/0631* (2013.01); *G06F 3/0638* (2013.01); *G06F 3/0646* (2013.01); *G06F 3/0679* (2013.01); *G06F 3/0683* (2013.01);
(Continued)

(58) Field of Classification Search
None
See application file for complete search history.

(56) References Cited

U.S. PATENT DOCUMENTS 8,161,236 B1  4/2012 Noveck et al.
8,533,404 B2  9/2013 Condit et al.
(Continued)

FOREIGN PATENT DOCUMENTS

EP  2264628  12/2010

OTHER PUBLICATIONS

Kerrisk, Michael. "MMAP(2)" (Web Page) Linux Programmer's Manual, Apr. 19, 2015, <https://web.archive.org/web/20150428015835/http://man7.org/linux/man-pages/man2/mmap2.html>.
(Continued)

*Primary Examiner* — Kevin Verbrugge
(74) *Attorney, Agent, or Firm* — Hewlett Packard Enterprise Patent Department (57) ABSTRACT

Example implementations relate to a storage memory direct access (SMDA) provider. The SMDA provider may pin a storage memory region to a memory address of a consumer machine, the storage memory region corresponding to a storage range of a storage device requested by the consumer machine. The SMDA provider may atomically commit data in the storage memory region accessed by the consumer machine via the memory address.

14 Claims, 8 Drawing Sheets (52) U.S. Cl.
CPC .......... *G06F 9/467* (2013.01); *G06F 12/0804* (2013.01); *G06F 12/126* (2013.01)

(56) References Cited

U.S. PATENT DOCUMENTS

| | | |
|---|---|---|
| 2002/0156764 A1 | 10/2002 | Goudie et al. |
| 2006/0085413 A1 | 4/2006 | Ogawa et al. |
| 2008/0059492 A1 | 3/2008 | Tarin |
| 2010/0049883 A1 | 2/2010 | Ben-Yehuda et al. |
| 2011/0289267 A1 | 11/2011 | Flynn et al. |
| 2013/0198447 A1 | 8/2013 | Yochai et al. |
| 2013/0227201 A1 | 8/2013 | Talagala et al. |

OTHER PUBLICATIONS

Kerrisk, Michael, "MSYNC (2)" (Web Page) Apr. 20, 2014, <https://web.archive.org/web/20150402053601/http://man7.org/linux/man-pages/man2/msync.2.html>.

International Search Report & Written Opinion received in PCT Application No. PCT/US2015/051688, dated Feb. 24, 2016, 15 pages.

Volos, H. et al., Mnemosyne: Lightweight Persistent Memory, (Research Paper), Mar. 5-11, 2011.

Wikipedia, "mmap," Apr. 3, 2015, <https://en.wikipedia.org/w/index.php?title=Mmap&oldid=654739935>.

STORAGE MEMORY DIRECT ACCESS

BACKGROUND

A consumer machine may have a processor and memory and may run an operating system and applications. A storage provider may include storage devices, such as hard disk drive arrays. A consumer machine may communicate with a storage provider through I/O channels, such as Fibre Channel, Internet Small Computer System Interface (iSCSI), Serial Attached Small Computer System Interface (SAS), and the like. The consumer machine may construct and queue I/O requests. The consumer machine may also cache data from the storage provider to reduce access times of frequently used data. Handling I/O requests and data caching may consume resources of the consumer machine processor.

BRIEF DESCRIPTION OF THE DRAWINGS

Various examples will be described below with reference to the following figures.

DETAILED DESCRIPTION

A consumer machine (e.g., a server, a workstation, or other computing device) may have a processor and memory. An operating system of the consumer machine may manage the memory and may run applications. A consumer machine may also communicate with a storage provider that includes storage device(s), such as hard disk drives, solid state drives, hard disk drive arrays, tape drives, optical drives, and the like. The consumer machine may be remote and/or isolated from the storage provider. The consumer machine may communicate with the storage provider through I/O channels, such as Fibre Channel, Internet Small Computer System Interface (iSCSI), Serial Attached Small Computer System Interface (SAS), and the like. To perform such communication, the consumer machine may construct and queue I/O requests (e.g., data read, write, modify), and send the I/O requests to the storage provider. The storage provider may then process the received I/O requests. Compared with the speed at which the consumer machine processor can construct and queue I/O requests, the storage provider may be slow at processing I/O requests, owing at least in part to access times of the storage provider's storage device(s). Because storage provider I/O request processing speed may be slow, the consumer machine may cache data from the storage provider to reduce access times of frequently used data. Furthermore, the consumer machine processor may perform data journaling prior to writing or modifying the data at the storage provider, to support transaction integrity principles such as atomicity of data updates. Management of I/O requests, data caches, and journaling may utilize processor resources of the consumer machine, but the computational resource cost may be deemed at least acceptable in view of the relatively slower storage provider speed.

Non-volatile or persistent memory, such as non-volatile dual inline memory modules (NV-DIMM), memristor memory, flash memory, phase-change memory, and the like, may be utilized as storage devices, and more particularly, as storage device(s) of the storage provider. Non-volatile or persistent memory may be faster than hard disk drives, solid state drives, disk arrays, tape drives, optical drives, and the like, and may be comparable in speed to system memory. Accordingly, the computational cost of managing I/O requests, data caching, and journaling by the consumer machine's processor may be more evident where non-volatile or persistent memory is utilized as storage devices.

Example techniques of the present application may relate to a storage memory direct access (SMDA) provider. The SMDA provider may pin a storage memory region to a memory address of a consumer machine in response to a pin command from the consumer machine. The storage memory region may be available to the consumer machine for data access via the memory address, and the storage memory region may correspond to a storage range of a storage device requested by the consumer machine in the pin command. The SMDA provider may atomically commit data in the storage memory region in response to an unpin command from the consumer machine. Accordingly, techniques of the present application may be useful for presenting a storage device to a consumer machine as memory and for offloading features, such as transactional integrity support, from the consumer machine.

Figure 1:
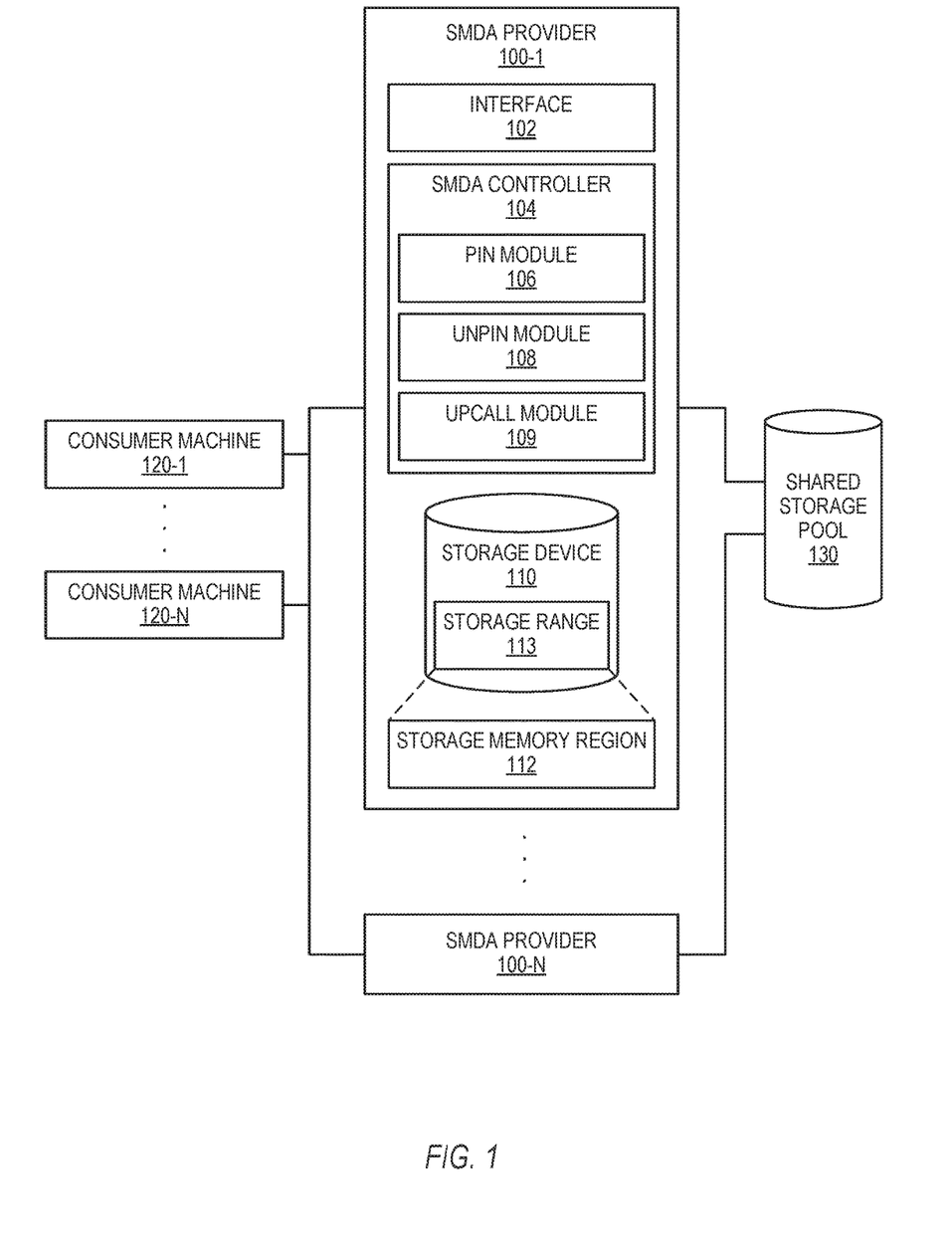
FIG. 1 is a block diagram of an example system including a storage memory direct access (SMDA) provider according to an implementation.

Referring now to the figures, FIG. 1 is a block diagram that includes an example storage memory direct access (SMDA) provider 100-1 with which a consumer machine 120-1 may initiate and operate an SMDA session. The SMDA provider 100-1 may include an interface 102 and an SMDA controller 104. The SMDA provider 100-1 may communicate with and/or may include a storage device 110, such as a hard disk drive, a solid-state drive, a disk array (e.g., a Small Computer Systems Interface, or SCSI, array) non-volatile or persistent memory (e.g., NV-DIMMs, memristor memory, flash memory, phase-change memory, and the like), or other device suitable for the persistent storage of data. In some implementations, the SMDA provider 100-1 may be included in a computing device that includes a processor.

The SMDA controller 104 may communicate with the interface 102, and the interface 102 may communicate with a consumer machine (e.g., 120-1). Accordingly, the SMDA controller 104, and more generally the SMDA provider 100-1, may communicate (i.e., transmit data, machine-readable instructions, etc.) with the consumer machine 120-1 via the interface 102 for an SMDA session. For example, in some implementations, the interface 102 may be or may include a memory bus interface. In some implementations, the interface 102 may include a network interface.

The consumer machine 120-1 may be included in, or be a virtual machine operating on, a computing system, such as a server, a workstation, a desktop computer, a laptop computer, a tablet computing device, a mobile device, or the like. In some implementations, a consumer machine 120-1, an SMDA provider 100-1, and a storage device 110 may all be included or enclosed in the same computing device. In some implementations, the SMDA provider 100-1 may be separate from or remote to the consumer machine 120-1. The consumer machine 120-1 may be operated by a user.

As will be described further herein below, the SMDA provider 100-1 may be among a plurality of similar SMDA providers (e.g., 100-1 through 100-N) and the consumer machine 120-1 may be among a plurality of consumer machines (e.g., 120-1 through 120-N). The SMDA providers 100-1 through 100-N may be in communication with one another. The consumer machines 120-1 through 120-N may be in communication with one another. Additionally, a particular consumer machine may communicate with multiple SMDA providers, and a particular SMDA provider may communicate with multiple consumer machines. Before discussing relationships between the plurality of SMDA providers 100-1 through 100-N and the plurality of consumer machines 120-1 through 120-N, example aspects of an SMDA session between a consumer machine 120-1 and a SMDA provider 100-1 will first be described.

In some implementations, SMDA sessions may be carried out using function calls or commands of an SMDA application programming interface (API). An SMDA session may be initiated by the consumer machine 120-1 by issuing an SMDA start command to the SMDA provider 100-1. In some implementations, the consumer machine 120-1 may provide a session ID with the SMDA start command to serve as an identifying parameter for subsequent commands (e.g., a pin command and an unpin command). An SMDA session may be terminated by the consumer machine 120-1 by issuing an SMDA stop command to the SMDA provider 100-1, together with the identifying session ID. During the SMDA session, the consumer machine 120-1 may send pin commands and unpin commands, which are processed by the SMDA provider 100-1, and more particularly, by the SMDA controller 104. The SMDA controller 104 may process the pin and unpin commands in a synchronous or asynchronous manner, depending generally on the speed of the storage device 110.

The SMDA controller 104 may include a pin module 106 to pin a storage memory region 112 to a memory address of a consumer machine 120-1, and an unpin module 108 to atomically commit data in the storage memory region. The SMDA controller 104 may also include an upcall module 109 to send a notification to the consumer machine 120-1 via the interface 102 if a trigger event affecting the storage memory region 112 is detected. As used herein, the term "module" may refer to a set of instructions encoded on a machine-readable medium of a device (e.g., the SMDA provider 100) and executable by a processor of the device. Additionally or alternatively, a module may include a hardware device comprising electronic circuitry for implementing the functionality described below.

The pin module 106 may be to pin (i.e., map) a storage memory region 112 to a memory address of the consumer machine 120-1, particularly in response to a pin command received from the consumer machine 120-1. The pin command received from the consumer machine may be accompanied by input parameters, such as the session ID and a storage range 113 of the storage device 110, which may be identified by at least one triplet that includes a volume ID, a logical block number, and a size. Other input parameters may be selected from an exclusive flag, an initialize flag, a read-only flag, and/or a memory type. In some implementations, the pin module 106 may process a pin command asynchronously (e.g., due to a slower speed storage device 110). More particularly, in an asynchronous mode, the SMDA provider 100-1 may send a "pending" status message upon receipt of a pin command and call back to the consumer machine 120-1 upon completion of processing the pin command with a "success" status message. For asynchronous implementations, pin command input parameters may include call-back related parameters, such as a pointer to a call back routine and a context for the call-back routine. Operation of the pin module 106 and the effect of pin command input parameters will now be described with reference to FIG. 2.

Figure 2:
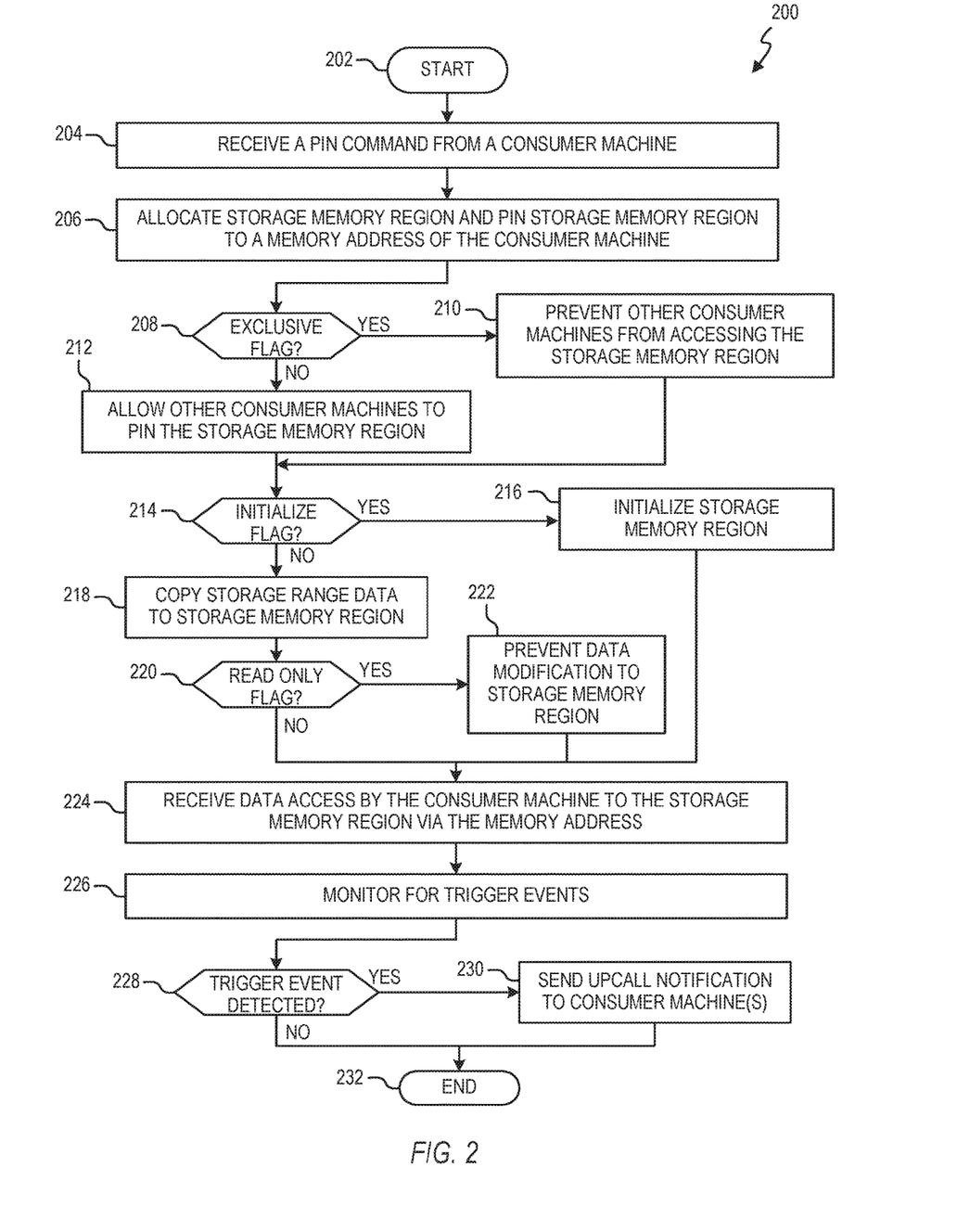
FIG. 2 is a flow diagram of an example method for responding to a pin command from a consumer machine according to an implementation.

FIG. 2 is a flowchart of an example method 200 of an SMDA provider (e.g., 100-1), and more specifically, of a pin module (e.g., 106) of an SMDA controller (e.g., 104), for handling a pin command received from a consumer machine (e.g., 120-1). Method 200 may be implemented in the form of executable instructions stored on a machine-readable storage medium and/or in the form of electronic circuitry. In some implementations of the present disclosure, one or more blocks of method 200 may be executed substantially concurrently or in a different order than shown in FIG. 2. In some implementations of the present disclosure, method 200 may include more or less blocks than are shown in FIG. 2. In some implementations, one or more of the blocks of method 200 may, at certain times, be ongoing and/or may repeat.

The method 200 may begin at block 202, and at block 204, the SMDA provider 100-1 may receive a pin command from the consumer machine 120-1. In some implementations, the pin command may include an input parameter specifying a particular storage range (e.g., 113) of a storage device (e.g., 110), and more particularly, specifying the storage range 113 by at least one triplet of a volume ID, a logical block number, and a size. In some implementations, the requested storage range 113 may be a plurality of locations in the storage device 110, as specified by a plurality of such triplets. The consumer machine 120-1 may request the storage range 113 in order to access data therein, or may request the storage range 113 in order to allocate a particular amount of storage at the SMDA provider 100.

At block 206, the pin module 106 responds to the pin command and the storage range requested therein. The pin module 106 first allocates a storage memory region (e.g., 112) corresponding to the requested storage range 113 (correspondence is indicated on FIG. 1 by the dashed lines between storage memory region 112 and storage range 113). For example, in some implementations, the storage memory region 112 and the storage range 113 may correspond in size. In some implementations, the storage memory region 112 may be allocated from memory included in the SMDA provider 100-1. In implementations where the storage device 110 is non-volatile or persistent memory (e.g., NV-DIMM, memristor memory, flash memory, phase-change memory, etc.), the storage memory region 112 may be allocated from the storage device 110. After allocating the storage memory region 112, the pin module 106 pins or maps the storage memory region 112 to a memory address in the memory address space of the consumer machine 120-1 (i.e., a memory address addressable by a processor of the consumer machine 120-1) and outputs the memory address to the consumer machine 120-1. In some implementations, the storage memory region 112 may be pinned or mapped to a plurality of memory addresses (e.g., owing to memory fragmentation). By virtue of pinning (or mapping) the storage memory region 112 to a memory address of the consumer machine 120-1, the consumer machine 120-1 may perform data access (e.g., read, write, modify, etc.) at the SMDA provider 100-1 as a memory operation, rather than as an I/O operation.

In some implementations, the pin command may include a memory type input parameter, which may specify memory attributes desired by the consumer machine 120-1. Example memory types include persistent, transient, or a memory speed. In response to a memory type input parameter, the pin module 106 may allocate the storage memory region 112 at block 206 from available memory devices, based on suitability to the memory type input parameter. For example, the pin module 106 may allocate the storage memory region 112 from non-volatile memory for a persistent memory type input parameter in contrast to volatile memory for a transient memory type input parameter. As another example, the pin module 106 may allocate the storage memory region 112 from memristor memory for a high speed memory type input parameter in contrast to flash memory for a lower speed memory type input parameter.

At block 208, if the pin command includes an exclusive flag as an input parameter, then control may pass to block 210 ("YES" at block 208). At block 210, the pin module 106 prevents other consumer machines in communication with the SMDA provider 100-1 (e.g., consumer machines other than the consumer machine 120-1 issuing the exclusive-flagged pin command, such as consumer machine 120-N) from accessing the storage range 113 of the storage device 110 requested by the consumer machine 120-1, rendering access to the storage memory region 112 and/or the storage range 113 exclusive to the consumer machine 120-1. In some implementations, the exclusivity may be terminated when a pin command is received from the consumer machine 120-1 that identifies the exclusive storage memory region 112 and/or the storage range 113 without an exclusive flag. In some implementations, if the pin module 106 receives a pin command from another consumer machine identifying the exclusive storage range 113, the pin module 106 may send an upcall notification (in a manner described below with respect to block 230) to the consumer machine 120-1, requesting that the consumer machine 120-1 terminate exclusivity in the aforementioned manner.

Returning to block 208, if the pin command does not include an exclusive flag as an input parameter ("NO" at block 208) or, in other implementations, if the pin command includes a shared flag instead of an exclusive flag, then control may pass to block 212 and the pin module 106 may allow other consumer machines (e.g., 120-N) to pin a same or overlapping part of the storage range 113 via pin commands. Where at least a part of the storage range 113 is shared between consumer machines, the sharing consumer machines may coordinate updates to the shared region among themselves in some implementations, with the assistance of upcall notifications described below with respect to block 230. After blocks 208 and 210, control may pass to block 214.

At block 214, if the pin command includes an initialize flag as an input parameter ("YES" at block 214), control may pass to block 216. At block 216, the pin module 106 may initialize the storage memory region 112 with zeroes (or any other suitable initialization scheme). By virtue of initializing the storage memory region 112, content in the storage memory region 112 persisting from a past SMDA session or other memory operation may be erased for security purposes. In some implementations, such security may not be necessary, and block 216 deems the storage memory region 112 initialized and ready for access by the consumer machine 120-1 without any erasing operation. Returning to block 214, if the pin command does not include an initialize flag ("NO" at block 214), then control may pass to block 218. At block 218, the pin module 106 may copy data from the requested storage range 113 of the storage device 110 to the storage memory region 112. After block 218, control may pass to block 220.

At block 220, if the pin command includes a read only flag as an input parameter ("YES" at block 220), then control may pass to block 222. If the pin command does not include a read only flag ("NO" at block 220), control may pass directly to block 224. At block 222, the pin module 106 prevents data modification to the storage memory region, particularly if data is copied from the storage range 113 to the storage memory region at block 218. After block 222, control may pass to block 224.

At block 224, the SMDA provider 100-1 receives or permits data access by the consumer machine 120-1 to the storage memory region 112. For example, the consumer machine 120-1, and more specifically, a processor thereof, addresses a data access operation (read, write, modify, etc.) to the memory address provided by the unpin module at block 204, and the SMDA controller 104 directs the data access to the storage memory region 112. Data in the storage memory region 112 may be non-persistent until the SMDA controller 104 commits the data to persistence in response to an unpin command from the consumer machine 120-1, as will be described below.

At block 226, the SMDA controller 204 monitors for trigger events. If a trigger event is detected ("YES" at block 228), control may pass to block 230, where the upcall module 109 may send an upcall notification to consumer machine(s). The particular consumer machine to which an upcall notification is sent, as well as the content of the upcall notification, may depend on the type of trigger event detected at block 228. Various examples of trigger events will now be described.

In some implementations, a trigger event may be a request from another consumer machine (e.g., 120-N) to access the storage range 113. For example, the request may be in the form of a pin command from the another consumer machine 120-N that identifies at least an overlapping portion of the storage range 113 already associated with the memory address of the consumer machine 120-1. In response, the upcall module 109 may notify the consumer machine 120-1 that another consumer machine 120-N is requesting access to the storage range 113. Additionally, if the storage memory region 112 associated with storage range 113 is pinned exclusively to the consumer machine 120-1, the upcall module 109 also may request that the consumer machine 120-1 terminate the exclusive pin.

In some implementations, a trigger event may be a non-SMDA access of the storage range 113 of the storage device 110 or the storage memory region 112. As but one example, a non-SMDA access may be a SCSI I/O operation for a SCSI array-based storage device 110. In response, the upcall module 109 may send an upcall notification to consumer machine 120-1 (and any other consumer machines sharing the storage memory range 112), indicating that data in the storage range 113 or the storage memory region 112 has changed.

In some implementations, a trigger event may be a request to the SMDA controller 104 from another consumer machine (e.g., 120-N) to atomically commit data in the storage memory region 112 (e.g., using an unpin command), particularly when the consumer machine 120-1 and the another consumer machine 120-N share the storage memory region 112. In response, the upcall module 109 may send an upcall notification to inform the consumer machine 120-1 of the pending commit of the storage memory region 112.

In some implementations, a trigger event may be an atomic commit of data in the storage memory region 112 scheduled by the SMDA controller 104 to establish a consistency point (as will be described below with respect to the unpin module 108 and FIG. 3). In response, the upcall module 109 may send an upcall notification to inform the consumer machine 120-1 (and any other consumer machines sharing the storage memory range 112) of the pending update to the storage memory region 112.

The method 200 may end at block 232. At some point after sending the pin command and accessing data in the storage memory region 112 via the memory address (i.e., at block 224), the consumer machine 120-1 may send an unpin command to the SMDA provider 100-1 to either commit data in the storage memory region 112 or to release the storage memory region 112. In some implementations, if the SMDA controller 100-1 does not receive a request from the consumer machine 120-1 to atomically commit the data (i.e., an unpin command) prior to a failure affecting the SMDA controller 100-1, such as a power failure or the like, the SMDA controller 100-1 may discard data in the storage memory region 112 after such a failure. In some cases, the consumer machine 120-1 may send the unpin command in response to an upcall notification indicating that the data in the storage memory region 112 has changed or is scheduled to be updated (as discussed above with respect to block 230 of FIG. 2), and then (though not necessarily) the consumer machine 120-1 may send a subsequent pin command to re-pin that storage range 113 with updated data.

Referring again to FIG. 1, the unpin module 108 may be to atomically commit data in the storage memory region 112 accessed by the consumer machine 120-1 via the memory address, particularly in response to an unpin command received from the consumer machine 120-1. The unpin command received from the consumer machine 120-1 may be accompanied by input parameters. For example, input parameters may include the session ID, the storage range 113, and the memory address. Additional input parameters may include a dirty flag, a consistency point flag, a keep-pinned flag, and an exclusive flag. As with the pin command, in asynchronous implementations, input parameters also may include a pointer to and context for a call-back routine, and the SMDA provider 100-1 may send to the consumer machine 120-1 a "pending" status message upon receipt of the unpin command and a "success" status message (e.g., via call back routine) upon completion of processing the unpin command. Operation of the unpin module 108 and the effect of unpin command input parameters will now be described with reference to FIG. 3.

Figure 3:
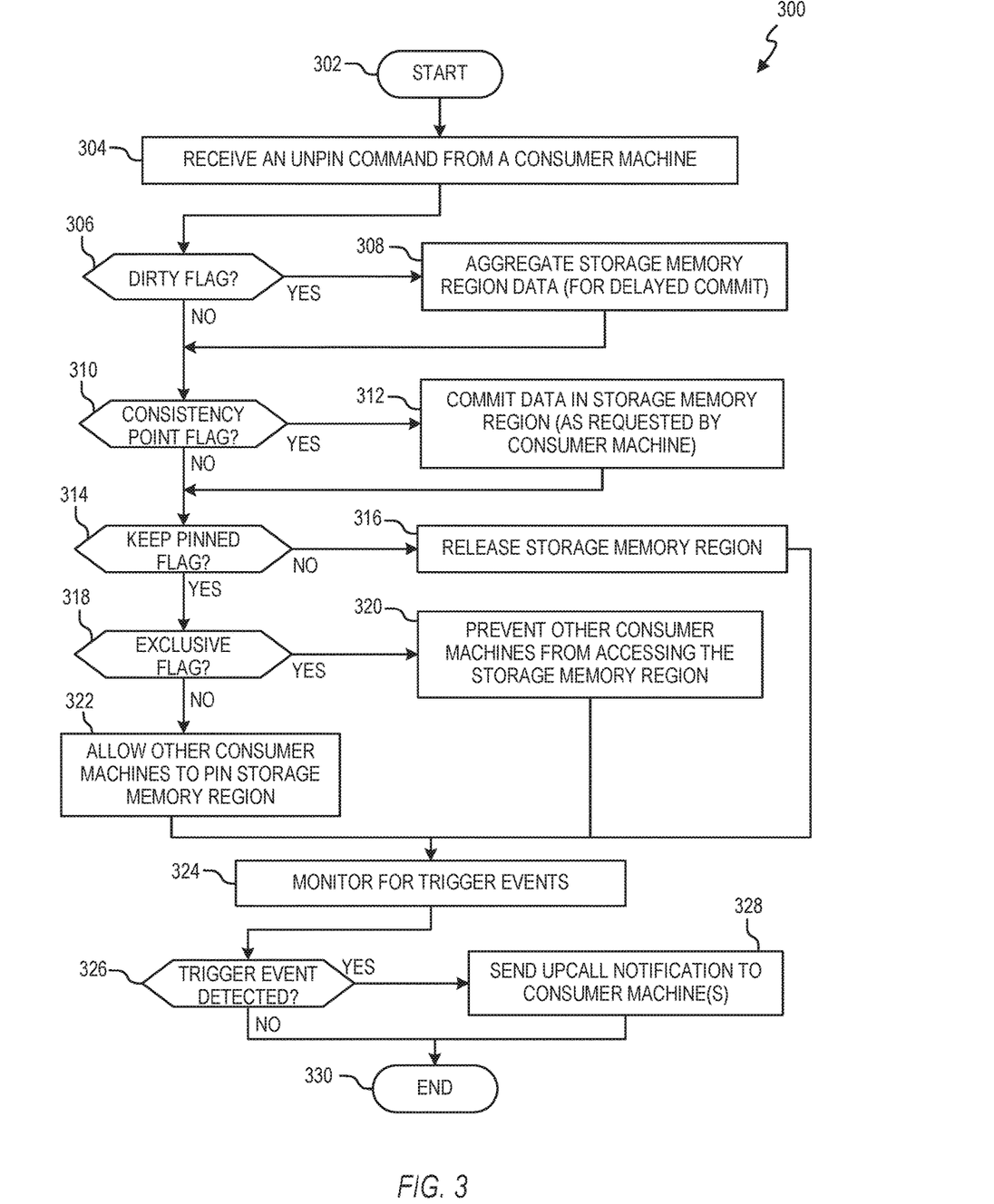
FIG. 3 is a flow diagram of an example method for responding to an unpin command from a consumer machine according to an implementation.

FIG. 3 is a flowchart of an example method 300 of an SMDA provider (e.g., 100-1), and more specifically, of an unpin module (e.g., 108) of an SMDA controller (e.g., 104), for handling an unpin command received from a consumer machine (e.g., 120-1). Method 300 may be implemented in the form of executable instructions stored on a machine-readable storage medium and/or in the form of electronic circuitry. In some implementations of the present disclosure, one or more blocks of method 300 may be executed substantially concurrently or in a different order than shown in FIG. 3. In some implementations of the present disclosure, method 300 may include more or less blocks than are shown in FIG. 3. In some implementations, one or more of the blocks of method 300 may, at certain times, be ongoing and/or may repeat.

The method 300 may begin at block 302, and at block 304, the SMDA provider 100-1 may receive an unpin command from the consumer machine 120-1. In some implementations, the unpin command may include an input parameter specifying at least one quadruplet that includes a volume ID, a logical block number, a size, and a memory address. The quadruplet may correspond to the storage range 113 requested with a previous pin command and a memory address returned by the pin module 106 in response to that pin command. Based on the unpin command and the accompanying at least one quadruplet, the unpin module 108 may identify and locate a storage memory region (e.g., 112) to be unpinned.

At block 306, if the unpin command includes a dirty flag as an input parameter ("YES" at block 306), then control may pass to block 308. At block 308, the unpin module 108 may aggregate storage memory region data to a consistency point determined by the unpin module 108 (also referred to herein as an "implicit consistency point"), and may atomically commit the aggregated storage memory region data to persistence. In other words, the unpin module 108 may delay committing the particular storage memory region identified by the unpin command until the implicit consistency point is reached For example, in some implementations, the implicit consistency point may be reached by aggregating (or accumulating, collecting, gathering, queueing, combining, etc.) data updates of multiple storage memory regions identified by multiple unpin commands to a threshold quantity (e.g., a quantity in bytes, a quantity of corresponding storage addresses or storage ranges, or other measures of quantity of data updates). In some implementations, the implicit consistency point may be reached by aggregating a threshold quantity of received unpin commands with dirty flag. In some implementations, the implicit consistency point may be reached on a time-based schedule, and storage memory region data is aggregated (e.g., from unpin commands received in the interim) until a next scheduled consistency point. In some implementations, the SMDA provider 100-1 may send the consumer machine 120-1 a "success" status message after receiving the unpin command but prior to the implicit consistency point being met. Once the implicit consistency point has been met, the unpin module 108 may atomically commit the aggregated storage memory region data to persistence (including the storage memory region 112 identified by the unpin command received at block 304 in the present example), by techniques such as setting persistence bits to make the aggregated storage memory region(s) persistent if the aggregated storage memory region(s) is/are allocated from the storage device 110 (e.g., where the storage device 110 is memristor memory), copying data from the aggregated storage memory region(s) to corresponding storage ranges of the storage device 110 (e.g., where the storage device 110 is a hard drive, SCSI array, etc.), and the like. In some implementations, when the aggregated storage memory region data has been successfully committed to persistence, the SMDA provider 100-1 may call back to the consumer machine 120-1 with a "success" status message to indicate that the data has been committed to persistence. In a situation where the SMDA provider 100-1 experiences a failure (e.g., due to a power failure or other system failure) but the aggregated storage memory region data did not reach the implicit consistency point, such data may be deemed unrecoverable due to the failure (and in some implementations, the method 300 may proceed directly to block 330 and end). However, by virtue of having the unpin module 108 determine the implicit consistency point, the SMDA provider 100-1 may atomically commit data to persistence in a flexible and efficient manner.

Figure 4:
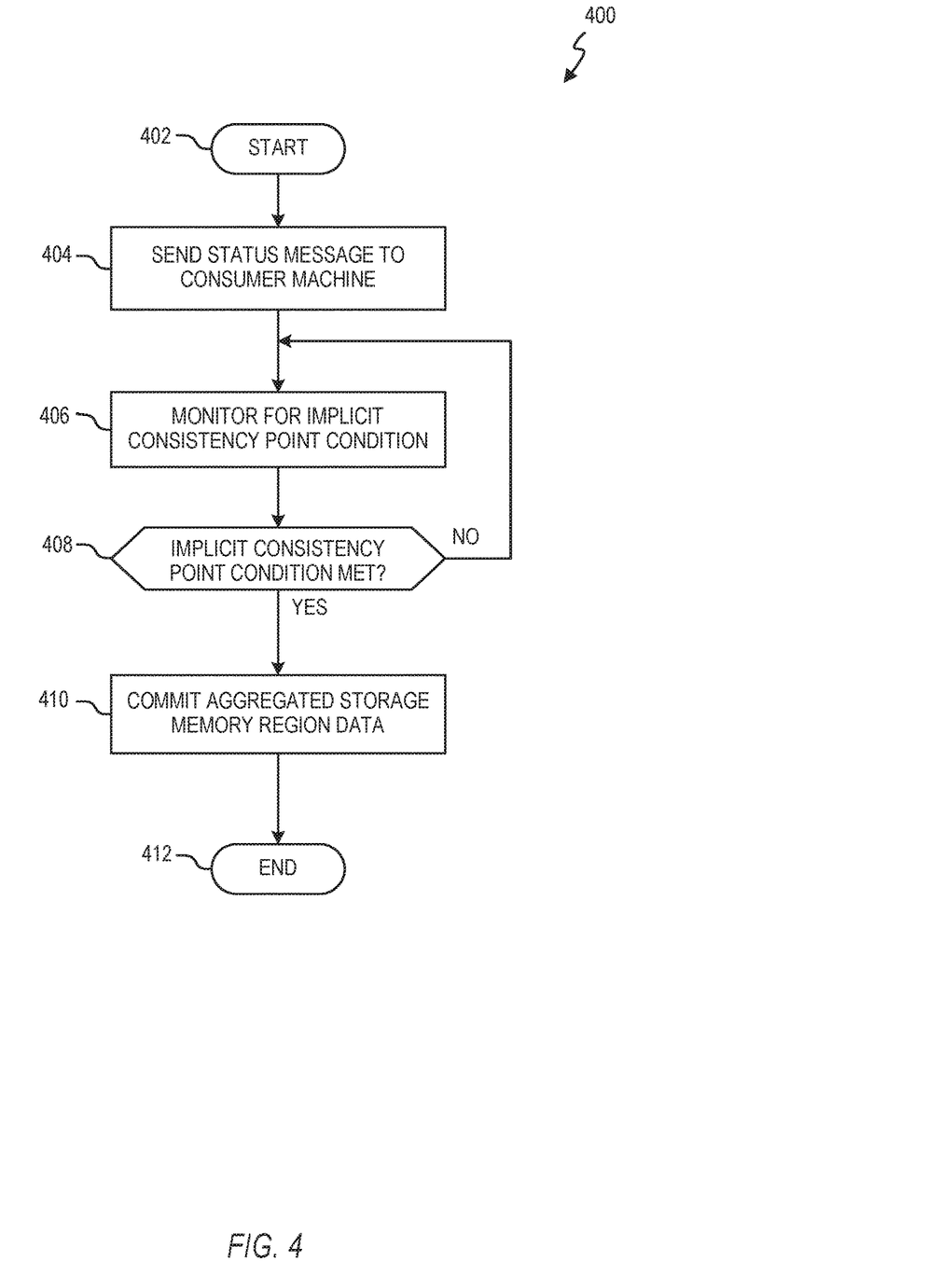
FIG. 4 is a flow diagram of an example method for monitoring for an implicit consistency point condition according to an implementation.

In some implementations, the unpin module 108 may perform block 308 for an unpin command with dirty flag received at block 304 according to an example method 400 depicted in FIG. 4. The method 400 may start at block 402. At block 404, the unpin module 108 may respond to the unpin command by sending a status message to the consumer machine 120-1 such as, for example, a "success" message. At block 406, the unpin module 108 may monitor whether an implicit consistency point condition has been met or reached. For example, as described above with respect to block 308, implicit consistency point conditions may relate to at least one of a threshold quantity of data updates to storage memory region(s), a threshold quantity of received unpin commands (with dirty flag), or a time-based schedule. Concurrently with block 406 or as part of block 406, the unpin module 108, in some implementations, may aggregate storage memory region data corresponding to at least one unpin command, or more particularly, corresponding to multiple unpin commands identifying multiple storage memory regions. At block 408, if the implicit consistency point condition is met ("YES" at block 408), control may pass to block 410 where the unpin module 108 may atomically commit aggregated storage memory region data to persistence, and in some implementations, also may call back to the consumer machine 120-1 with a "success" status message indicating that the data has been committed. On the other hand, if the implicit consistency point condition is not met ("NO" at block 408), control may return to block 406 and the unpin module may continue to monitor whether the implicit consistency point condition has been met. The method 400 may end at block 412.

By virtue of the foregoing method 400, it may be understood that the SMDA provider 100-1 may send a "success" status message to the consumer machine 120-1 (at block 404) in response to an unpin command with dirty flag without waiting for the data commit to complete, and the unpin module 108 may check (at blocks 406, 408) whether an implicit consistency point has been met or reached in an asynchronous manner as a background operation. For example, the consumer machine 120-1, after receiving the status message sent at block 404 in response to a particular unpin command, may perform other data updates and issue other pin or unpin commands, without waiting for confirmation that the data of the storage memory region identified in the particular unpin command has been committed. As another example, the unpin module 108 may process other unpin commands according to the method 300 while performing blocks 406, 408 in the background.

Referring again to FIG. 3, after block 308 or if the unpin command does not include a dirty flag as an input parameter ("NO" at block 306), control may pass to block 310. At block 310, if the unpin command includes a consistency point flag as an input parameter ("YES" at block 310), then control may pass to block 312. A consistency point flag indicates that the consumer machine 120-1 expects (and may wait for) the data of the storage memory region 112 to be committed to persistence, for purposes of transaction consistency for example. Accordingly, at block 312, the unpin module 108 atomically commits storage memory region data associated with the consistency point requested by the consumer machine to persistence. Such a consistency point may also be referred to as an explicit consistency point, because it is explicitly requested by the consumer machine rather than determined by the unpin module 108 as with an implicit consistency point. In some implementations, an unpin command with a consistency point flag may identify a storage memory region involved in a pending unpin command, such as an unpin with dirty flag that is awaiting an implicit consistency point according to the method 400 described above, and the unpin module 108 may interrupt that pending unpin command to atomically commit the storage memory region data to persistence as explicitly requested by the unpin command with consistency point flag. As with block 308, the unpin module 108 may atomically commit the data by switching persistence bit(s), copying the data, or other suitable methods. In some implementations, the SMDA provider 100-1 may call back to the consumer machine 120-1 with a "success" status message when the storage memory region data associated with the explicit consistency point is committed to the persistence. After block 312 or if the unpin command does not include a consistency point flag as an input parameter ("NO" at block 310), control may pass to block 314.

At block 314, if the unpin command does not include a keep-pinned flag as an input parameter ("NO" at block 314), then control may pass to block 316 where the unpin module 108 may release the storage memory region 112. Accordingly, if the unpin command does not include a dirty flag, a consistency point flag, or a keep-pinned flag, the consumer machine 120-1 is effectively releasing (or "forgetting") the storage memory region 112 without making persistent data updates. After block 316, control then may pass to block 324, which will be described below. On the other hand at block 314, if the unpin command includes a keep-pinned flag as an input parameter ("YES" at block 314), then the storage memory region remains pinned to the memory address of the consumer machine 120-1, and control may pass to block 318.

At block 318, the consumer machine 120-1 may change the exclusive/shared status of the pinned storage memory region 112 in a similar manner to the exclusive flag described above with respect to FIG. 2 (e.g., blocks 208, 210, and 212). If the unpin command includes an exclusive flag ("YES" at block 318), then control may pass to block 320, and the unpin module 108 prevents other consumer machines (e.g., 120-N) from accessing the storage memory region 112. If the unpin command does not include an exclusive flag ("NO" at block 318) or, in other implementations, includes a shared flag, then control may pass to block 322, and the unpin module 108 may allow other consumer machines (e.g., 120-N) to pin the storage memory region 112 or a portion thereof. After blocks 320 and 322, control may pass to block 324.

At block 324, the SMDA controller 204 may monitor for trigger events, and if a trigger event is detected ("YES" at block 228), control may pass to block 230, where the upcall module 109 may send an upcall notification to consumer machine(s). The upcall notification content and recipient consumer machine may depend on the type of trigger event. Various trigger events will now be described. In some implementations, a trigger event may be receipt of the unpin command itself at block 304, particularly if the unpin command includes a dirty flag or a consistency point flag, and in response, the upcall module 109 may notify any consumer machines that share the storage memory region 112 with the consumer machine 120-1 of the requested unpin and/or the pending data commit. In some implementations, a trigger event may be a change in the pin exclusivity status of the storage memory region 112 at blocks 318, 320, and/or 322. For example, if the storage memory region 112 (or a portion thereof) is shared between the consumer machine 120-1 and other consumer machine(s) (e.g., 120-N) and the unpin command from the consumer machine 120-1 includes an exclusive flag as an input parameter, the upcall module may notify the other consumer machine(s) 120-N of the change in exclusivity and request that the other consumer machine(s) 120-N unpin the storage memory region 112. The method 300 may end at block 330.

In some implementations, the SMDA controller 104 may receive a plurality of unpin commands (which also may be referred to as data commit requests) from the consumer machine 120-1, each of the unpin commands identifying different respective storage memory regions (not shown). The unpin module 108 may atomically commit data in the different respective storage memory regions in an order that the unpin commands were received by the SMDA controller 104. The SMDA controller 104 may use any suitable technique for logically managing the order of unpin commands. If the plurality of unpin commands include dirty flags, the data updates corresponding to the plurality of unpin commands may be aggregated towards an implicit consistency point, as described above with respect to block 308.

Figure 5:
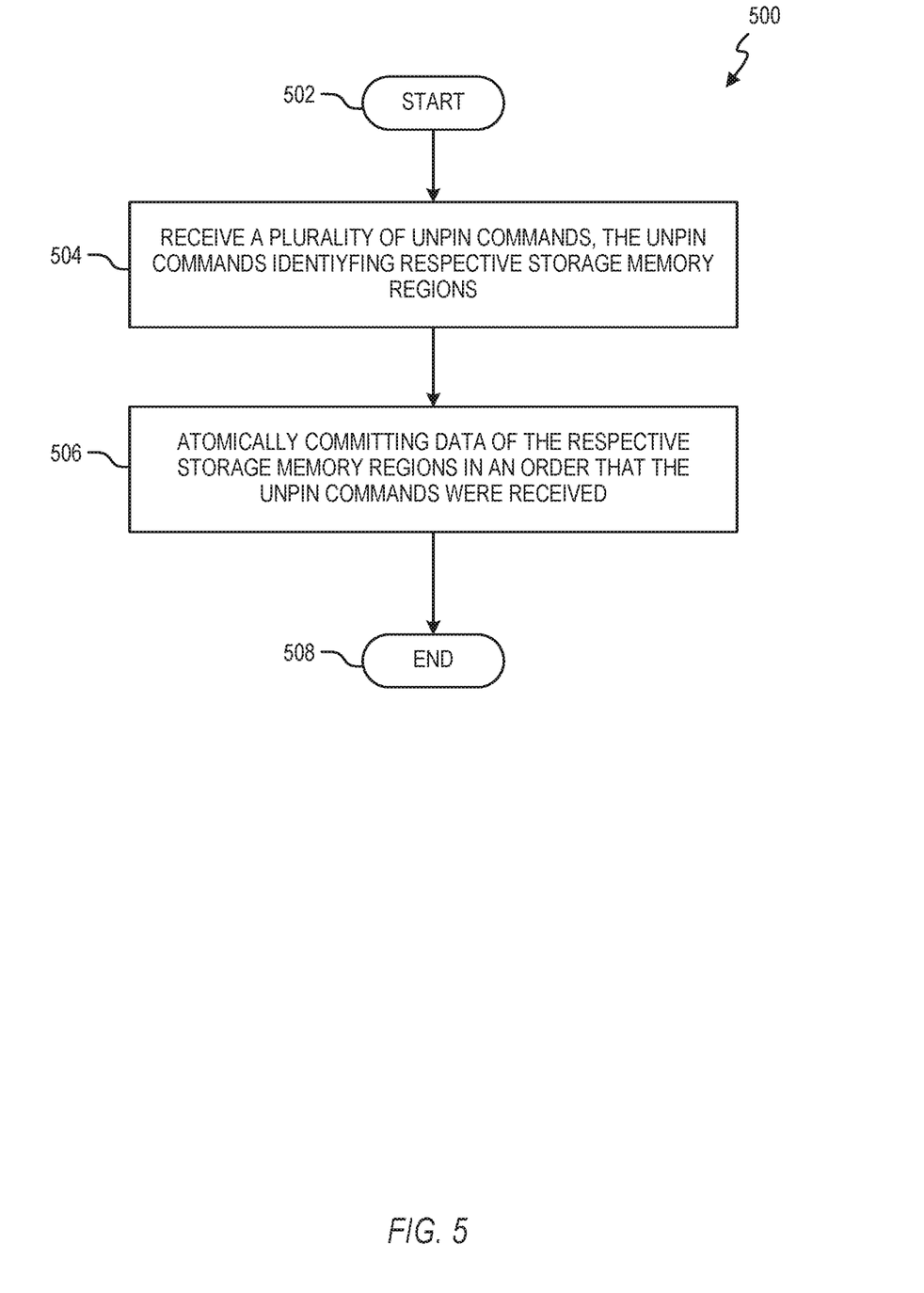
FIG. 5 is a flow diagram of an example method for responding to a plurality of unpin commands according to an implementation.

FIG. 5 is a flowchart of an example method 500 for responding to a plurality of unpin commands. Method 500 may be implemented in the form of executable instructions stored on a machine-readable storage medium and/or in the form of electronic circuitry. The method 500 may begin at block 502, and at block 504, an SMDA controller (e.g., 104), and more particularly an unpin module (e.g., 108) of the SMDA controller 104, may receive a plurality of unpin commands, the unpin commands identifying respective storage memory regions. At block 506, the SMDA controller 104 (the unpin module 108), may atomically commit data of the respective storage memory regions in an order that the unpin commands were received by the SMDA controller 104. At block 508, the method 500 may end.

As described above, the SMDA provider 100-1 may be among a plurality of similar SMDA providers (e.g., 100-1 through 100-N). For example, each SMDA provider may include at least an interface (like 102) and an SMDA controller (like 104). At least some of the SMDA providers may include (or communicate with) respective storage devices (like 110). The consumer machine 120-1 may be among a plurality of consumer machines 120-1 through 120-N. Additionally, a particular consumer machine may communicate with multiple SMDA providers, and a particular SMDA provider may communicate with multiple consumer machines. In some implementations, an SMDA controller (e.g., 104) of an SMDA provider (e.g., 100-1) may coordinate, via an interface (e.g., 102) of the SMDA provider 100-1, with other SMDA provider devices (e.g., 100-N) to support a shared storage pool 130. The shared storage pool 130 may be a virtual storage pool consolidated from physical storage devices of the plurality of SMDA providers. In some implementations, any of consumer machines 120-1 through 120-N may send a pin or unpin command (as well as SMDA start and stop commands) to any of the SMDA providers 100-1 through 100-N. The pin or unpin command may identify as an input parameter a storage range of the shared storage pool 130 (or alternatively, a storage range of a storage device of any SMDA provider, including an SMDA provider that is not the SMDA provider receiving the pin or unpin command). Owing to communication and coordination between SMDA providers 100-1 through 100-N, an SMDA controller (e.g., 104) may pin a storage memory region in at least one of the other SMDA provider devices (e.g., 100-N) to a memory address of at least one consumer machine, and furthermore, may atomically commit data to a persistent region of the shared storage pool 130. By virtue of the foregoing relationships and interactions between a plurality of SMDA providers 100-1 through 100-N and/or a plurality of consumer machines 120-1 through 120-N, a multiple SMDA provider and/or multiple consumer machine scale-out system may be easily and efficiently implemented.

Figure 6:
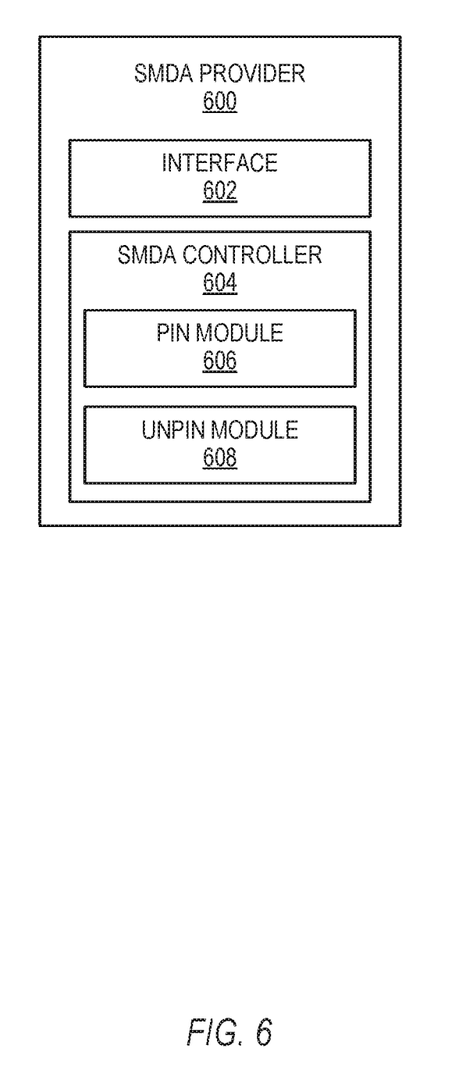
FIG. 6 is a block diagram of an example SMDA provider according to an implementation.

FIG. 6 is a block diagram that includes an example SMDA provider 600. The SMDA provider 600 may include an interface 602 to communicate with a consumer machine. The SMDA provider 600 may include an SMDA controller 604 that communicates with the interface 602. In some implementations, the SMDA controller 604 may include a pin module 606 and an unpin module 608, each of which may be a set of instructions encoded on a machine-readable medium of a device (e.g., the SMDA provider 600) and executable by a processor of the device, and additionally or alternatively, may include a hardware device comprising electronic circuitry for implementing the functionality described below. The pin module 606 may be to pin a storage memory region to a memory address of the consumer machine, the storage memory region corresponding to a storage range of a storage device requested by the consumer machine. The unpin module 608 may be to atomically commit data in the storage memory region accessed by the consumer machine via the memory address.

Figure 7:
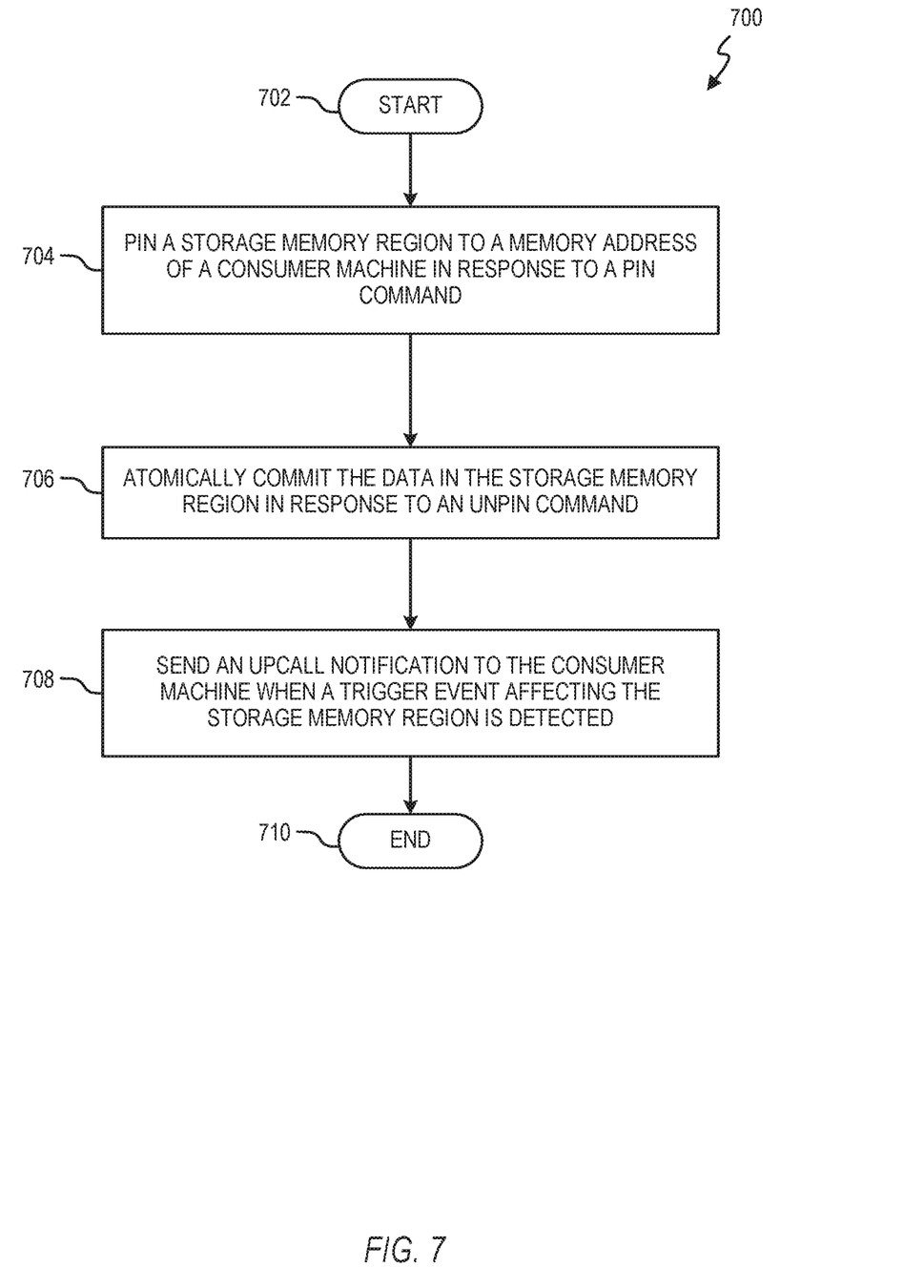
FIG. 7 is a flow diagram of an example method for responding to a pin command and for responding to an unpin command according to an implementation.

FIG. 7 is a flowchart of an example method 700 for responding to a pin command and for responding to an unpin command. Although execution of method 700 is described below with reference to SMDA controller 104 of FIG. 1, it should be understood that execution of method 700 may be performed by other suitable devices, such as SMDA controller 604 of FIG. 6. Method 700 may be implemented in the form of executable instructions stored on a machine-readable storage medium and/or in the form of electronic circuitry.

The method 700 begins at block 702, and at block 704, the SMDA controller 104 may pin a storage memory region to a memory address of a consumer machine in response to a pin command from the consumer machine, the storage memory region being available to the consumer machine for data access via the memory address, and the storage memory region corresponding to a storage range of a storage device requested in the pin command. At block 706, the SMDA controller 104 may atomically commit data in the storage memory region in response to an unpin command from the consumer machine. At block 708, the SMDA controller 104 may send an upcall notification to the consumer machine when a trigger event affecting the storage memory region is detected. At block 710, the method 700 may end.

Figure 8:
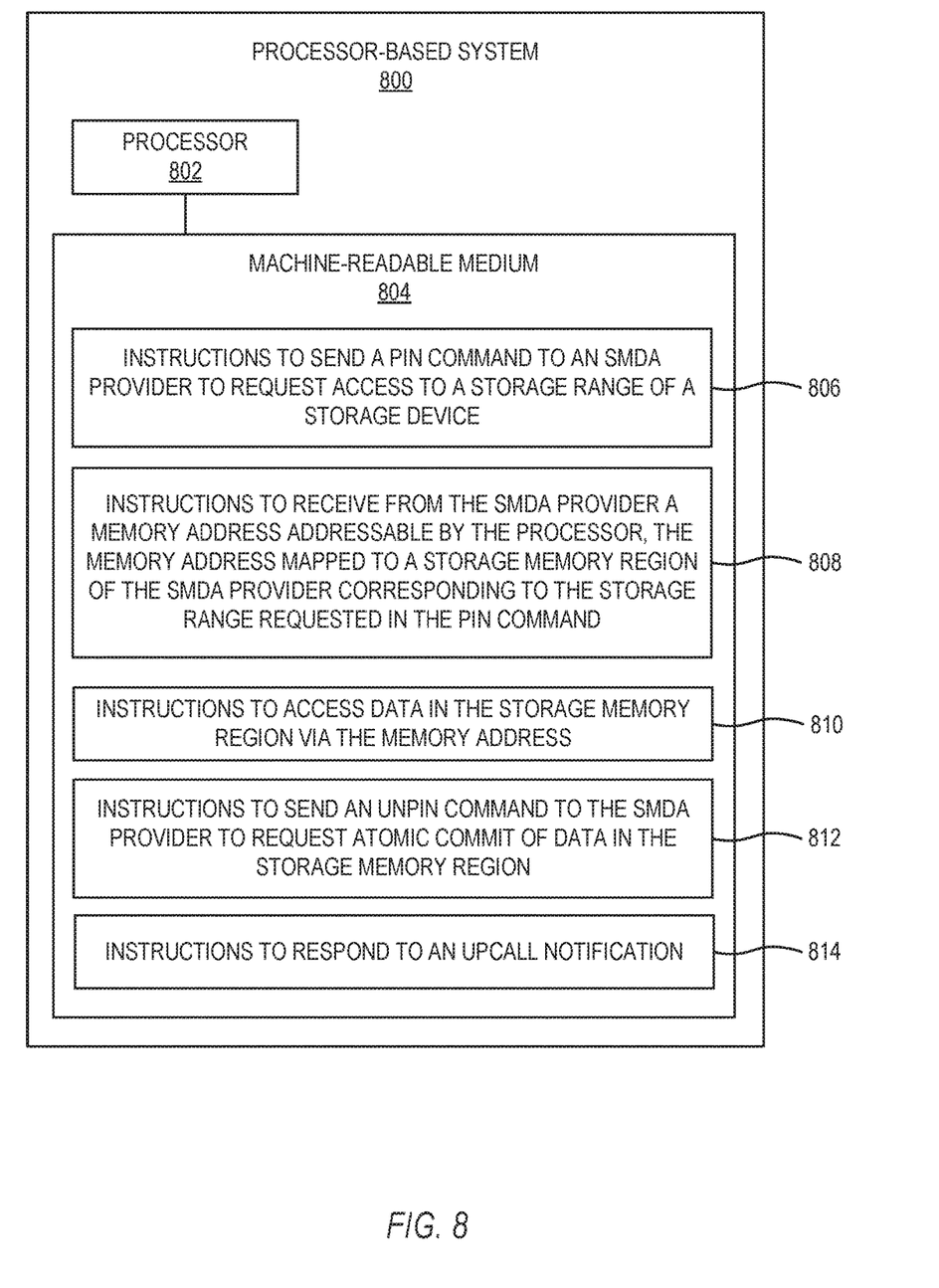
FIG. 8 is a block diagram showing a non-transitory, machine-readable medium encoded with example instructions to access data in a storage memory region of an SMDA provider via a memory address.

FIG. 8 is a block diagram illustrating a processor-based system 800 that includes a machine-readable medium encoded with instructions to access data in a storage memory region of an SMDA provider via a memory address according to an example implementation. In some example implementations, the system 800 may be or may form part of a computing device, such as a server, a workstation, a desktop computer, a laptop computer, a tablet computing device, a mobile device, or the like. More particularly, the system 800 may be or form part of any of the consumer machines 120-1 through 120-N described above with respect to FIG. 1. In some implementations, the system 800 is a processor-based system and may include a processor 802 coupled to a machine-readable medium 804. The processor 802 may include a single-core processor, a multi-core processor, an application-specific integrated circuit, a field programmable gate array, and/or other hardware device suitable for retrieval and/or execution of instructions from the machine-readable medium 804 (e.g., instructions 806, 808, 810, 812, 814) to perform the various functions discussed herein. Additionally or alternatively, the processor 802 may include electronic circuitry for performing the functionality described herein, including the functionality of instructions 806, 808, 810, 812, and/or 814. With respect to the executable instructions represented as boxes in FIG. 8, it should be understood that part or all of the executable instructions and/or electronic circuits included within one box may, in alternate implementations, be included in a different box shown in the figures or in a different box not shown.

The machine-readable medium 804 may be any medium suitable for storing executable instructions, such as random access memory (RAM), electrically erasable programmable read-only memory (EEPROM), flash memory, hard disk drives, optical discs, and the like. In some example implementations, the machine-readable medium 804 may be a tangible, non-transitory medium, where the term "non-transitory" does not encompass transitory propagating signals. The machine-readable medium 804 may be disposed within system 800, as shown in FIG. 8, in which case the executable instructions may be deemed "installed" on the system 800. Alternatively, the machine-readable medium 804 may be a portable (e.g., external) storage medium, for example, that allows system 800 to remotely execute the instructions or download the instructions from the storage medium. In this case, the executable instructions may be part of an "installation package." As described further herein below, the machine-readable medium 804 may be encoded with a set of executable instructions 806, 808, 810, 812, 814.

Instructions 806, when executed by the processor 802, may send a pin command to a SMDA provider (such as SMDA provider 100-1 described above with respect to FIG. 1) to request access to a storage range of a storage device. In some implementations, the pin command may include input parameters, such as those described above with respect to FIG. 2, including a session ID, the storage range of the storage device as a collection of triplets (volume ID, logical block number, and size), an exclusive flag, an initialize flag, a read-only flag, a memory type flag, and/or call back related parameters. Instructions 808, when executed by the processor 802, may receive from the SMDA provider a memory address addressable by the processor 802, the memory address mapped to a storage memory region of the SMDA provider corresponding to the storage range requested in the pin command (i.e., a pin command sent by instructions 806). Instructions 810, when executed by the processor 802, may access (e.g., read, write, modify, etc.) data in the storage memory region via the memory address (i.e., the memory address received by instructions 808). Instructions 812, when executed by the processor 802, may send an unpin command to the SMDA provider to request an atomic commit of data in the storage memory region. In some implementations, the unpin command may include input parameters, such as those described above with respect to FIG. 3, including a session ID, the storage range as a collection quadruplets (volume ID, logical block number, size, and memory address), a dirty flag, a consistency point flag, a keep-pinned flag, and/or call back related parameters. Instructions 814, when executed by the processor 802, may respond to an upcall notification from the SMDA provider. In some implementations, the instructions 814 may respond to an upcall notification by sending an unpin command to the SMDA provider to release the storage memory region. In some implementations, the instructions 814 may send a subsequent pin command (i.e., after the unpin command responsive to the upcall notification) to the SMDA provider to request access to the storage range.

In view of the foregoing description, it can be appreciated that, by virtue of an SMDA provider, a consumer machine may access data (i.e., read, write, modify, etc.) in a storage device as though the consumer machine were accessing memory. Moreover, support for atomicity of data updates, consistency of data updates, and isolation of consumer machines, may be offloaded from consumer machines to the SMDA provider. Accordingly, consumer machines may update data faster and more efficiently (e.g., with lower computational cost) via the SMDA provider than with I/O requests, particularly when the storage devices comprise high speed non-volatile or persistent memory devices.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A storage memory direct access (SMDA) provider device comprising:
   an interface to communicate with a consumer machine;
   an SMDA controller to communicate with the interface, the SMDA controller including:
      a pin module to pin a storage memory region to a memory address of the consumer machine, the storage memory region corresponding to a storage range of a storage device requested by the consumer machine, and
      an unpin module to atomically commit data in the storage memory region accessed by the consumer machine via the memory address,
   wherein the SMDA controller is to receive a plurality of data commit requests from the consumer machine, each of the data commit requests identifying different respective storage memory regions,
   wherein the unpin module is to aggregate data in each of the different respective storage memory regions until it is determined by the unpin module that an implicit consistency point has been reached, based on a threshold or time-based schedule, and
   wherein the unpin module is to atomically commit the aggregated data to a persistent region of a shared storage pool.

2. The SMDA provider device of claim 1, wherein the SMDA controller further includes an upcall module to send a notification to the consumer machine via the interface if a trigger event affecting the storage memory region is detected.

3. The SMDA provider device of claim 2, wherein
   the consumer machine is among a plurality of consumer machines, and
   the trigger event is a request from another consumer machine of the plurality of consumer machines to access the storage range.

4. The SMDA provider device of claim 2, wherein the trigger event is:
   a non-SMDA access of the storage memory region or the storage range, or
   a request to the SMDA controller from another consumer machine to atomically commit data in the storage memory region, the consumer machine and the another consumer machine sharing the storage memory region.

5. The SMDA provider device of claim 1, wherein
the unpin module is to release the storage memory region, and
the pin module is to copy data from the storage range to the storage memory region.

6. The SMDA provider device of claim 1, wherein the SMDA controller is to discard data in the storage memory region after a failure affecting the SMDA controller if the SMDA controller did not receive a consumer machine request to atomically commit the data prior to the failure.

7. The SMDA provider of claim 1, wherein
the unpin module is to atomically commit the aggregated data in the different respective storage memory regions in an order that the data commit requests were received by the SMDA controller.

8. The SMDA provider device of claim 1, wherein the SMDA controller is to coordinate, via the interface, with other SMDA provider devices to support the shared storage pool, and to pin a storage memory region in at least one of the other SMDA provider devices to a memory address of at least one consumer machine.

9. The SMDA provider of claim 1, wherein the storage device is non-volatile memory or a SCSI array, and the interface includes a memory bus interface.

10. A method comprising:
pinning, by a storage memory direct access (SMDA) provider, a storage memory region to a memory address of a consumer machine in response to a pin command from the consumer machine, the storage memory region being available to the consumer machine for data access via the memory address, and the storage memory region corresponding to a storage range of a storage device requested in the pin command;
atomically committing, by the SMDA provider, data in the storage memory region in response to an unpin command from the consumer machine; and
sending an upcall notification to the consumer machine when a trigger event affecting the storage memory region is detected.

11. The method of claim 10, wherein the trigger event is:
a pin command from another consumer machine to request access to the storage range,
an unpin command from another consumer machine sharing the storage memory region with the consumer machine to atomically commit data in the storage memory region,
a non-SMDA access of the storage memory region or the storage range, or
an atomic commit of data in the storage memory region scheduled by the SMDA provider to establish a consistency point.

12. The method of claim 10, further comprising:
receiving a plurality of unpin commands by the SMDA provider, the unpin commands identifying respective storage memory regions; and
atomically committing data of the respective storage memory regions in an order that the unpin commands were received by the SMDA provider.

13. A non-transitory machine readable medium comprising instructions executable by a processor of a processor-based system to:
send a pin command to a storage memory direct access (SMDA) provider to request access to a storage range of a storage device;
receive from the SMDA provider a memory address addressable by the processor, the memory address mapped to a storage memory region of the SMDA provider corresponding to the storage range requested in the pin command;
access data in the storage memory region via the memory address;
send an unpin command to the SMDA provider to request an atomic commit of data in the storage memory region; and
respond to an upcall notification from the SMDA provider, the content of the upcall notification based on a type of trigger event detected by the SMDA provider.

14. The non-transitory machine readable medium of claim 13, wherein the instructions to respond to an upcall notification is to send an unpin command to the SMDA provider to release the storage memory region and to send a subsequent pin command to the SMDA provider to request access to the storage range.

* * * * *